United States Patent [19]

Matsumoto et al.

[11] 4,176,907

[45] Dec. 4, 1979

[54] SCANNING DEVICE

[75] Inventors: Kazuya Matsumoto, Yokohama; Naoto Kawamura, Inagi; Setsuo Minami, Yokohama, all of Japan

[73] Assignee: Canon Kabushiki Kaisha, Tokyo, Japan

[21] Appl. No.: 830,340

[22] Filed: Sep. 2, 1977

[30] Foreign Application Priority Data

Sep. 3, 1976 [JP] Japan .................................. 51-105463

[51] Int. Cl.² ............................................ G02B 27/17
[52] U.S. Cl. ....................................... 350/6.8; 358/75; 358/199
[58] Field of Search ...................... 350/6, 7, 3.5, 285, 350/287, 181, 182, 6.9, 6.91, 285, 6.8; 358/75, 206, 199, 204; 346/74; 35/12; 355/3 TE, 8, 47

[56] References Cited

U.S. PATENT DOCUMENTS

| | | | |
|---|---|---|---|
| 1,840,799 | 1/1932 | Waddell | 350/6 |
| 3,360,659 | 12/1967 | Young | 350/6.7 |
| 3,630,594 | 12/1971 | Gorog | 350/7 |
| 3,667,360 | 6/1972 | Vicik | 350/6.7 |
| 3,733,979 | 5/1973 | England | 350/6 |
| 3,750,189 | 7/1973 | Fleischer | 350/7 |
| 3,774,990 | 11/1973 | Beck et al. | 350/181 |
| 3,785,713 | 1/1974 | Walles | 350/6 |
| 3,922,059 | 11/1975 | Noguchi | 350/7 |
| 3,944,323 | 3/1976 | Starkweather | 350/6 |
| 4,024,341 | 5/1977 | Takahashi | 358/206 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

When a stationary beam is caused to impinge upon a deflecting mirror surface disposed parallel to the rotation axis of a deflecting mirror, from a finite angle with respect to a plane crossing both the rotation axis and the deflecting mirror at right angles therewith, the path of the scanning beam reflected from the deflecting mirror surface becomes conically shaped. This specification discloses a scanning device including a correcting optical element for changing the conical path of the scanning beam to a linear path.

10 Claims, 9 Drawing Figures

FIG. 4
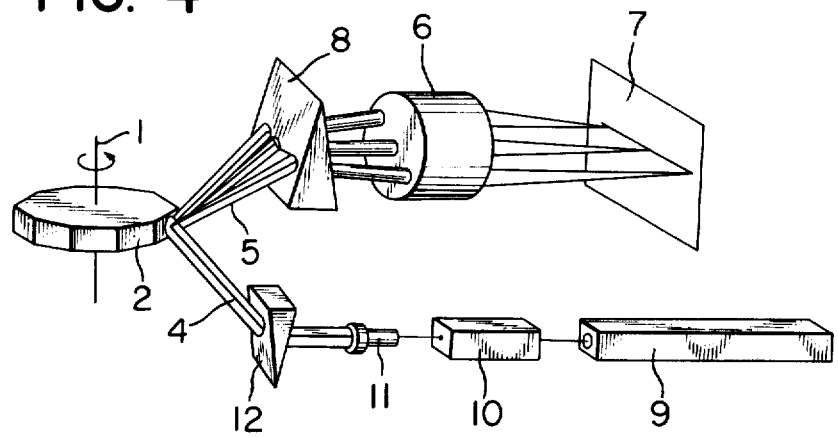
FIG. 5
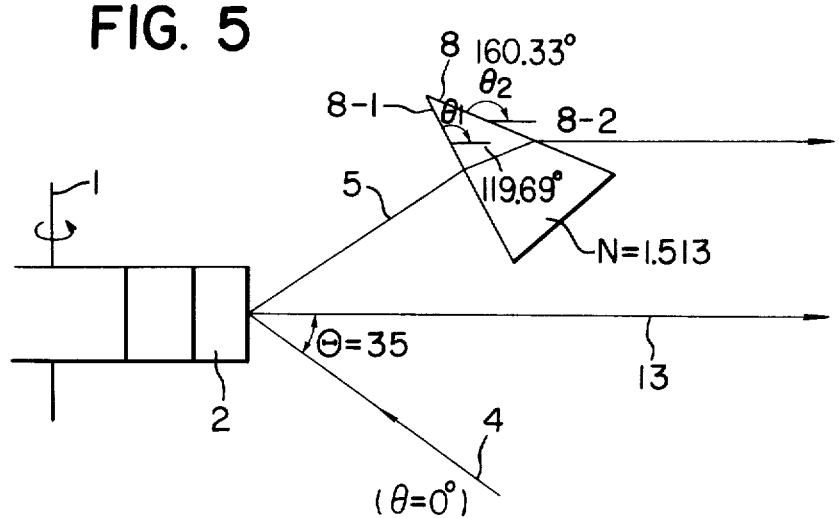
FIG. 6
| ROTATIONAL ANGLE OF MIRROR | 0° | 3° | 6° | 9° | 12° |
|---|---|---|---|---|---|
| $\alpha$ | 0° | 4.917° | 9.816° | 14.679° | 19.483° |
| $\Delta\theta$ | 0° | 0° | 0° | 0.028° | 0.052° |

SCANNING DEVICE

BACKGROUND OF THE INVENTION

Field of the Invention

This invention relates to a scanning device and more particularly to a scanning device which is capable of providing a linear scanning line even if a stationary beam is caused to impinge upon a deflecting mirror surface disposed parallel to the rotation axis of the deflecting mirror, from a finite angle with respect to a plane crossing both the rotation axis and the deflecting mirror at right angles therewith.

When a stationary beam is caused to impinge upon a deflecting mirror surface disposed parallel to the rotation axis of the deflecting mirror, from a finite angle with respect to a plane crossing both the rotation axis and the deflecting mirror at right angles therewith—this will hereinafter be referred to the case where the stationary beam is caused to impinge obliquely—the path of the scanning beam from the deflecting mirror surface assumes a conical shape with the point of incidence of the stationary beam as the vertex. Accordingly, the scanning line formed by such scanning beam is not linear. As the deflector having a deflecting mirror surface parallel to the rotation axis, there is known a rotatable polygonal mirror, a galvano-mirror or the like.

SUMMARY OF THE INVENTION

It is an object of the present invention to provide a scanning device which is capable of providing a linear scanning line even if a stationary beam is caused to impinge obliquely upon a deflecting mirror surface.

Such an object may be achieved by disposing a correcting optical element between the deflecting mirror surface and the scanned surface.

The invention will become more fully apparent from the following detailed description thereof taken in conjunction with the accompanying drawings.

BRIEF DESCRIPTION OF THE DRAWINGS

FIG. 4 shows a first embodiment of the present invention.

FIG. 5 is a view depicting a portion of FIG. 4 in greater detail.

FIG. 6 is a table showing the angle of deviation of the scanning beam and the amount of displacement of the scanning beam for the angle of rotation of the deflecting mirror provided according to the embodiment of FIG. 4.

DESCRIPTION OF THE PREFERRED EMBODIMENTS

Figure 1:
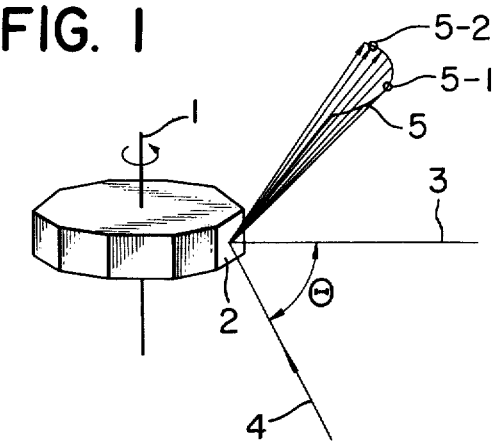
FIG. 1 shows a conical path of the scanning beam provided when a light beam is caused to impinge obliquely upon a polygonal member.
Figure 2:
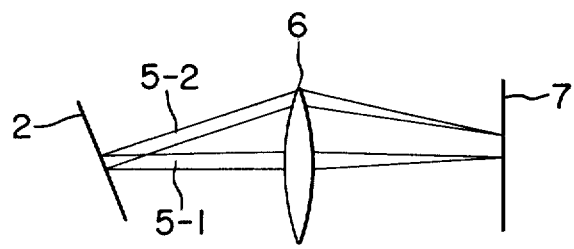
FIG. 2 illustrates the manner in which the scanning beam provided in FIG. 1 is condensed by a condenser lens.

In FIG. 1 which shows the scanning beam provided in the case where a stationary beam is caused to impinge obliquely upon a deflecting mirror surface of a rotatable polygonal mirror, reference character 1 designates a rotation axis and 2 denotes a deflecting mirror surface disposed parallel to the rotation axis. Designated by 3 is a plane crossing both the rotation axis 1 and the deflecting mirror surface 2 at right angles therewith. Such plane is simply shown as a straight line. A stationary beam 4 is caused to impinge upon the deflecting mirror surface at a finite angle of $\Theta$ with respect to the plane 3. Denoted by 5 is a scanning beam deflected by the deflecting mirror surface 2 and depicting a conical path as shown. If the scanning beam depicting such a conical path is condensed on a scanned surface by a condenser lens 6, the scanning line becomes not linear, but curved. More specifically, as shown in FIG. 2, the scanning line becomes curved because the scanning beams 5-1 and 5-2 are condensed at different heights on the scanned surface 7. This is attributable to the difference between the angles formed by the respective scanning beams with the optic axis of the condensing optical system.

Making the scanning line linear may be accomplished by making the direction of travel of the scanning beam 5 parallel to the optic axis of the condenser lens 6. More specifically, the scanning beam may be made linear by disposing between the deflecting mirror surface 2 and the condenser lens 6 an optical element for making the direction of travel of the scanning beam 5 from the deflecting mirror surface 2 parallel to the optic axis of the condenser lens 6. That is, the scanning beam may be made linear by having a correcting optical element included in the condensing optical system.

Figure 3:
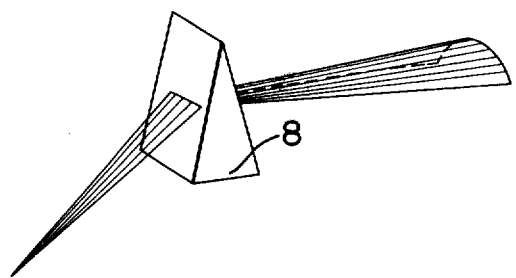
FIG. 3 illustrates the characteristic of a prism.

A prism would occur to mind as such an optical element. A prism 8, as shown in FIG. 3, has a characteristic that when a sheet-like light beam diverging only in one direction enters the prism 8, there is provided a conical diverging beam. Thus, by disposing such prism between the deflecting mirror surface 2 and the condensing lens 6, a linear scanning line may be obtained. FIG. 4 shows the optical arrangement according to a first embodiment of the present invention in which the prism 8 is disposed between the deflecting mirror surface 2 and the condenser lens 6. The laser beam emitted from a laser beam source 9 is intensity-modulated by a modulator 10 and has its beam diameter expanded by a beam expander 11. The collimated beam emergent from the beam expander 11 is caused by an entrance side prism 12 to impinge upon a deflecting mirror surface 2 and toward the rotation axis of the rotatable polygonal mirror upwardly at an angle of $\Theta$ with respect to the plane 3 perpendicular to the rotation axis 1. The scanning beam from the rotatable polygonal mirror 2 is caused to assume a conical path by the rotation of the rotatable polygonal mirror, as already noted. This scanning beam 5 is downwardly bent by the prism 8. At this time, if the prism is arranged in a suitable manner, the scanning beam 5 forming the conical path may be offset by converse action and converted into a beam parallel to the optic axis of the condenser lens. FIG. 5 illustrates the manner in which the first embodiment is carried out.

In FIG. 5, the laser beam 4 impinges upon the deflecting surface 2 at an angle of 35° with respect to the line 13 on which the plane 3 is orthogonal with the plane of the drawing sheet. The prism 8 has a refractive index N of 1.513 and the direction of the edge thereof is depthwise of the drawing sheet. The angle $\theta_1$ of the entrance surface 8-1 and the angle $\theta_2$ of the exit surface, of the prism, with respect to the line 13 in the plane of the drawing sheet, is 119.69° and 160.33°, respectively. When the rotational angle of the rotatable polygonal mirror is $\theta°$, namely, when the line 4 is orthogonal with the deflecting mirror surface 2, the laser beam from the prism has an angle of 26° with respect to the line 13 in the plane of the drawing sheet. FIG. 6 shows, in table, the angle of deviation of the laser beam with respect to the angle of rotation of the deflecting mirror surface 2 of the rotatable polygonal mirror and the angle $\Delta\theta$ formed by the scanning beam at each deflected position on the plane of the drawing sheet with respect to the scanning beam provided when the angle of rotation of the deflecting mirror surface 2 is 0°. As is apparent from this table, each scanning beam travels substantially parallel, so that a substantially linear scanning line may be obtained on the scanned surface by adjusting the optic axis of the condenser lens to such direction of travel of the scanning beam.

In the embodiment of FIG. 4, a single prism is shown for simplicity, whereas the number of the prisms may be increased to ensure correction to be effected with an increased degree of freedom if a wider angle is to be scanned or if a higher degree of correction is desired.

A prism system using a plurality of prisms is usually called the prism anamorphic afocal system and by disposing such afocal system between the deflecting mirror surface 2 and the condenser lens 6, correction of the tilting of the rotation axis 1 becomes possible. Thus, by utilizing the fact that the magnification and the angular magnification of an expanded beam is usually in inverse proportion to each other and accordingly, the angular magnification of the beam in the scanning direction is constant while the angular magnification of the beam in a direction perpendicular thereto is decreased to enable the correction of the so-called tilting, and by arranging the afocal system such that the emergent light from this system is expanded as compared with the incident light, the phenomenon of tilting may be alleviated to thereby provide a linear scanning line.

Figure 7:
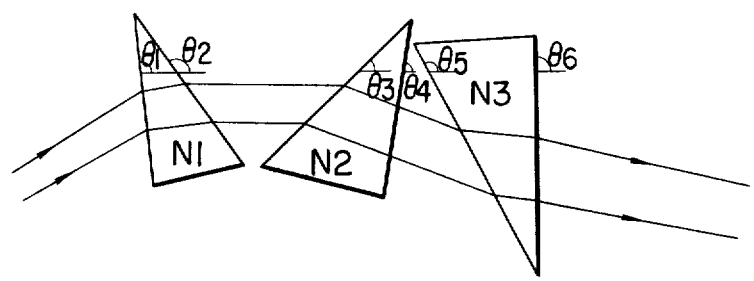
FIG. 7 illustrates an anamorphic afocal optical system.

FIG. 7 shows only the afocal system in an embodiment wherein the correction of the tilting has been effected. This afocal system comprises three prisms $N_1$, $N_2$ and $N_3$ and respective surfaces of these prisms have angles $\theta_1 = 119.5°$, $\theta_2 = 160.4°$, $\theta_3 = 3.74°$, $\theta_4 = 4.68°$, $\theta_5 = 126.76°$ and $\theta_6 = 123.79°$, all with respect to the line 14, and the refractive indices of the respective prisms are $N_1 = 1.513$ and $N_2 = N_3 = 1.91411$. In this case, the light beam having a perpendicular cross-section to the scanning direction is expanded to enable the correction of the tilting.

Turning back to the table of FIG. 6, it will be seen that the angle of deviation $\alpha$ of the scanning beam is not in proportional relationship with the angle of rotation of the deflecting mirror surface. Therefore, even if a prism is used to correct the scanning line into a linear line, the movement of the condensed spot light on the scanning line is not linear when use is made of a conventional condenser lens (a lens having a strain characteristic expressible as $y = f \tan \theta$).

However, assuming that the angle of incidence of the scanning beam impinging on the condenser lens is $\Theta$, the condenser lens should be given such a distortion that the focus position y may be expressed as:

$$y = f \cos \Theta \sin^{-1}(\sin\alpha/\cos\Theta)$$

Such a condenser lens may readily be designed by any common lens designer.

Figure 8:
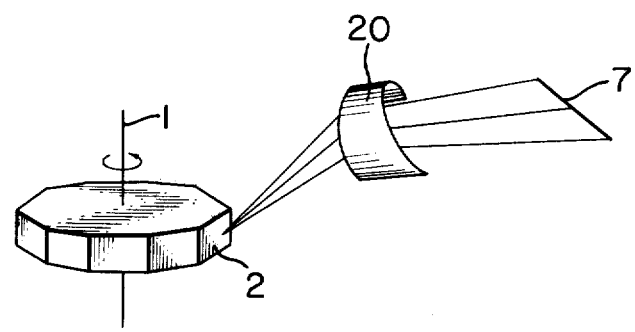
FIG. 8 shows a second embodiment of the present invention.
Figure 9:
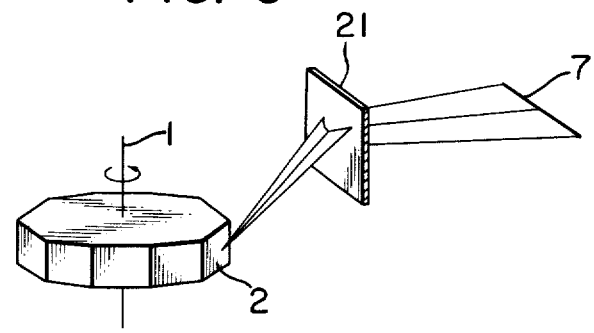
FIG. 9 shows a third embodiment of the present invention.

In the foregoing, description has been made with respect to a case where a prism 8 is included in the condensing optical system to thereby impart an inverse correction to the scanning beam depicting a conical path from the deflecting surface and make linear the scanning line on the scanned surface, whereas the scanning optical system of the present invention is not restricted to such a prism 8 but the optical element may also be a non-spherical mirror, a diffraction grating, a hologram or the like. FIG. 8 shows an embodiment which uses a non-spherical mirror. By this non-spherical mirror 20, the parallel scanning beam following a conical path from the deflecting mirror surface 2 has its direction of travel changed to a parallel direction and is condensed on the scanned surface. Thus, the non-spherical mirror itself may be said to be a condensing optical system having the actions of both the condenser lens 6 and the prism 8 in the previous embodiment. FIG. 9 shows an embodiment which employs a hologram 21. This hologram is made by imparting to a hologram recording medium a wave front passing through the hologram recording medium and forming numberless spot images on the linear line and a wave front equivalent to the scanning beam from the deflecting mirror surface 2 and therefore, by causing the scanning beam to impinge on the prepared hologram, the spot images may be successively reproduced to thereby enable linear scanning.

What we claim is:

1. A scanning device capable of providing a linear scanning line on a surface to be scanned, comprising:
   a deflector having a deflecting mirror surface disposed parallel to the rotation axis thereof;
   a light source optical system for causing a stationary collimated beam to impinge upon said deflecting mirror surface from a finite angle with respect to a plane crossing both said rotation axis and said deflecting mirror surface at right angles therewith and toward the rotation axis of the deflecting surface; and
   a correcting optical element disposed between said deflecting mirror surface and said surface to be scanned for correcting a curved scanning line to a linear scanning line.

2. A scanning device according to claim 1, wherein said correcting optical element is a prism having its edge line perpendicular to a plane which includes the axis and said beam.

3. A scanning device according to claim 1, wherein said correcting optical element is a prism anamorphic afocal converter.

4. A scanning device according to claim 3, wherein said prism anamorphic afocal converter expands an emergent beam with respect to an incident beam.

5. A scanning device according to claim 1, wherein said converting optical element is a non-spherical concave mirror.

6. A scanning device according to claim 1, wherein said correcting optical element is a hologram.

7. A scanning device capable of providing a linear scanning line on a surface to be scanned, comprising:
   a deflector having a deflecting mirror disposed parallel to the rotation axis thereof;
   a light source optical system for causing a stationary collimated beam to impinge upon said deflecting mirror surface from a finite angle with respect to a plane crossing both said rotation axis and said deflecting mirror surface at right angles therewith;

a condensing optical system for condensing the scanning beam from the deflecting mirror surface upon the surface to be scanned; and an optical element for correcting the scanning beam in a parallel relationship with the optic axis of said condensing optical system.

8. A scanning device according to claim 6, wherein the focusing characteristic of said condensing optical system is:

$$y = f \times \sin^{-1}\{\sin\alpha/x\},$$

where
- x: a constant of the positive sign less than 1,
- α: angle of incidence of the deflected beam on the condensing optical system,
- f: focal length of the condensing optical system.

9. A scanning device capable of providing a linear scanning line on a surface to be scanned, comprising:
  a deflector having a deflecting mirror surface disposed parallel to the rotation axis thereof;
  a light modulation optical system for causing a modulated collimated beam to impinge upon said deflecting mirror surface from a finite angle with respect to a plane crossing both said rotation axis and said deflecting mirror surface at right angles therewith and towards the rotation axis of the deflector; and
  a correcting optical element disposed between said deflecting mirror surface and said surface to be scanned for correcting a curved scanning line to a linear scanning line.

10. A scanning device according to claim 9, wherein said light modulator optical system includes a laser beam source and a modulator.

* * * * *